US010702962B2

(12) United States Patent
Sugiura (10) Patent No.: US 10,702,962 B2
(45) Date of Patent: Jul. 7, 2020

(54) SWARF HANDING APPARATUS

(71) Applicant: OKUMA Corporation, Niwa-gun, Aichi (JP)

(72) Inventor: Hiroyuki Sugiura, Niwa-gun Aichi (JP)

(73) Assignee: OKUMA CORPORATION, Niwa-Gun Aichi (JP)

(*) Notice: Subject to any disclaimer, the term of this patent is extended or adjusted under 35 U.S.C. 154(b) by 0 days.

(21) Appl. No.: 15/964,706

(22) Filed: Apr. 27, 2018

(65) Prior Publication Data

US 2018/0311777 A1  Nov. 1, 2018

(30) Foreign Application Priority Data

Apr. 27, 2017 (JP) .................................. 2017-088831

(51) Int. Cl.
*B23Q 11/00* (2006.01)
*B23B 25/02* (2006.01)

(52) U.S. Cl.
CPC .......... *B23Q 11/0057* (2013.01); *B23B 25/02* (2013.01); *B23Q 11/0042* (2013.01); *B23B 2270/30* (2013.01)

(58) Field of Classification Search
CPC . B23B 25/02; B23B 2270/30; B23Q 11/0064; B23Q 11/0057; B23Q 11/0075; B23Q 11/0042
See application file for complete search history.

(56) References Cited

FOREIGN PATENT DOCUMENTS

| JP | 59001133 A | * | 1/1984 | ......... B23Q 11/0064 |
|----|-----------|---|--------|------------------------|
| JP | 60167706 A | * | 8/1985 | ......... B23Q 11/0042 |
| JP | 61117047 A | * | 6/1986 | ......... B23Q 11/0042 |
| JP | H0725008 B2 | * | 3/1995 | ......... B23Q 11/0042 |
| JP | H11138306 A | | 5/1999 | |
| JP | 2012056020 A | | 3/2012 | |
| JP | 2016124054 A | | 7/2016 | |

OTHER PUBLICATIONS

English translation of JP2016124054 (Year: 2016).*

* cited by examiner

*Primary Examiner* — Alan Snyder
(74) *Attorney, Agent, or Firm* — Cantor Colburn LLP (57) ABSTRACT

A swarf handling apparatus installed in a machining tool that performs machining operation accompanied with production of stringy swarf includes a swarf catching device. The swarf catching device includes a holder unit that holds the stringy swarf when the stringy swarf makes contact with the holder unit. The swarf catching device causes the holder unit to be floated in a region around a machining point in such a manner that the position of the holder unit is varied relative to the machining point, for catching the stringy swarf in the holder unit.

8 Claims, 5 Drawing Sheets

SWARF HANDING APPARATUS

CROSS REFERENCE TO RELATED APPLICATION

The present application claims priority under 35 U.S.C. § 119 to Japanese Patent Application No. 2017-088831 filed on Apr. 27, 2017, the entire content of which is incorporated herein by reference.

TECHNICAL FIELD

The present disclosure relates to a swarf handling apparatus to be installed in a machine tool that performs machining operation accompanied with production of stringy swarf.

BACKGROUND

Cutting operations in which a workpiece is cut and shaped using a tool, such as, in particular, turning, drilling, and threading, may produce stringy swarf formed of lengthily joined pieces of swarf. The thus-produced stringy swarf may be wound around the workpiece and the tool, resulting in deteriorated processing accuracy, occurrence of a scratch on a machined surface, degradation of the tool, a halt of machining operation, or other failures. Further, once the stringy swarf has been wound around the tool and other components, because it is almost impossible to automatically remove the wound stringy swarf, machining operation should be temporarily interrupted in order to allow an operator to manually remove the stringy swarf. Such a removal task greatly decreases an operating rate of the machine tool.

Under the circumstances, techniques for preventing winding of the stringy swarf have conventionally been suggested. The suggested techniques include, for example, intermittently performing cutting operation to shorten a length of stringy swarf, and blowing the stringy swarf by means of a jet of a high-pressure coolant. However, the intermittent cutting operation raises other problems in that a lifespan of a tool blade is shortened and that the length of lead time is increased. On the other hand, in the case of using the jet of the high-pressure coolant, the jetted coolant may enter the inside of a telescopic cover and exert detrimental effects on a sliding part.

CITATION LIST

Patent Literature

Patent Document 1: JP H11-138306 A
Patent Document 2: JP 2012-56020 A
Patent Document 3: JP 2016-124054 A Other techniques for preventing winding of swarf are described in JP H11-138306 A, JP 2012-56020 A, and JP 2016-124054 A. JP H11-138306 A discloses an arrangement of a cut blower for sucking pieces of swarf and shredding the sucked pieces. JP 2012-56020 A discloses that a swarf guide channel for guiding swarf along a desired direction is attached to a tool. Meanwhile, JP 2016-124054 A discloses that a spool is arranged to wind up swarf. Further, in JP 2016-124054 A, a relative position of the spool and a tool is maintained constant, or the position of the spool or the like is corrected based on an analysis result obtained by analyzing a delivery direction of swarf using an image recognition technique.

However, in the techniques described in the disclosures of JP H11-138306 A, JP 2012-56020 A, and JP 2016-124054 A, after a piece of stringy swarf is once caught, it becomes possible to continuously collect the caught piece of stringy swarf in an automatic way, although the techniques have difficulty in automatically catching a generated piece of stringy swarf. In the technique described in JP H11-138306, for example, the piece of stringy swarf, which is once caught in a suction port of the cut blower, can be automatically and continuously collected. However, catching a new free piece of stringy swarf by sucking the new free piece into the suction port of the cut blower requires that the suction port of the cut blower be positioned in close proximity to a tip end of a newly generated piece of stringy swarf. However, it has been extremely difficult to accurately predict a delivery direction of the newly generated piece of stringy swarf, because the delivery direction can greatly vary depending on processing conditions and environmental situations. Therefore, it is not possible to always position the suction port of the cut blower in close proximity to the tip end of the piece of stringy swarf, resulting in problematic difficulty in automatic catching of stringy swarf. Similarly, in the techniques described in JP 2012-56020 A and 2016-124054 A, it has been impossible to automatically catch a tip end of stringy swarf newly generated through machining operation unless the position of the tip end of stringy swarf is accurately predicted. The position of the tip end of stringy swarf cannot be easily predicted, and in practice, it is almost impossible for any recovery device (such as the cut blower, the swarf guide channel, or the spool) to automatically catch the stringy swarf.

The present disclosure discloses a swarf handling apparatus capable of catching and collecting stringy swarf with a higher degree of reliability.

SUMMARY

In an aspect of the present invention, the present disclosure discloses a swarf handling apparatus to be installed in a machine tool that performs machining operation accompanied by production of stringy swarf. The swarf handling apparatus includes a swarf catching device equipped with a holder unit that holds the stringy swarf when the stringy swarf makes contact with the holder unit, in which the swarf catching device causes the holder unit to be floated in a region around a machining point in such a manner that the position of the holder unit is varied relative to the machining point, for catching the stringy swarf in the holder unit.

The holder unit which is floated can easily make contact with the stringy swarf even though a delivered position of the stringy swarf cannot be easily predicted. Thus, with the holder unit, the stringy swarf can be caught and collected with a higher degree of reliability.

In the above-described configuration, the swarf handling apparatus may further comprise a swarf discarding device that receives and discards the stringy swarf, and the swarf catching device may be configured to direct the stringy swarf caught by the swarf catching device into the swarf discarding device for discarding the stringy swarf.

In the thus-configured swarf handling apparatus, because it is not required that the swarf catching device collect all of the stringy swarf, the swarf catching device may be simplified in structure.

In the above-described configuration, the swarf catching device causes the holder unit that is holding the caught stringy swarf to travel toward the swarf discarding device, to thereby direct the caught string swarf into the swarf discarding device, and a travel speed of the holder unit traveling toward the swarf discarding device is preferably lower than or equal to a speed of growth of the stringy swarf.

When the travel speed of the holder unit is lower than or equal to the speed of growth of the stringy swarf, breakage of the stringy swarf by a puling force can be effectively prevented.

Further, in the above configuration, at least a part of the holder unit may be configured to be rotatable.

The rotation of the holder unit can facilitate catching of the stringy swarf in the holder unit. Further, when the holder unit is configured to be rotatable, it becomes possible to wind the stringy swarf around the holder unit and collect the wound stringy swarf.

Still further, the holder unit may include at least one of a protruding region, a bent region, an uneven region, and a curved region to engage with the stringy swarf, and may hold the engaged stringy swarf.

When the holder unit is configured as described above, the stringy swarf can be easily caught by the holder unit.

Further, the holder unit may include a magnet and use a magnetic force for holding stringy swarf formed of a ferromagnetic material.

The thus-configured holder unit can catch the stringy swarf formed of the ferromagnetic material in a highly reliable manner.

In addition, the holder unit may include a gripping member that removably grips an entanglement member with which the stringy swarf is entangled, and may be configured to hold the stringy swarf which is entangled with the entangled member.

The thus-configured holder unit can catch the stringy swarf with a higher level of reliability. Meanwhile, when the gripping member releases the entangling member, the stringy swarf is also detached from the swarf catching device, which facilitates detachment of the stringy swarf. Further, in this configuration, properties of the entanglement member may be changed based on characteristics of the stringy swarf.

Moreover, the holder unit may include a detachable region that can be detached from the swarf catching device with the caught stringy swarf. Further, the holder unit may include a body region and a protruding region which is configured to be protrudable from and retractable into the body region, in which the protruding region may be protruded from the body region to hold the stringy swarf that is engaged with the protruding region, and the protruding region may be retracted into the inside of the body region to detach the stringy swarf from the holder unit. Still further, the holder unit may include an electromagnet, to thereby hold the stringy swarf by means of a magnetic form created by energizing the electromagnet, and the holder unit may be configured to detach the stringy swarf from the holder unit itself by deenergizing the electromagnet.

In the above-described configuration, catching of the stringy swarf by means of the holder unit can be facilitated, while the stringy swarf held by the holder unit can be easily detached from the swarf catching device.

According to the swarf handling apparatus disclosed in this disclosure, the holder unit which is floated can easily make contact with the stringy swarf even without precise prediction of the delivery position of the stringy swarf, and thus the stringy swarf can be caught and collected with a higher degree of reliability.

BRIEF DESCRIPTION OF DRAWINGS

Embodiments of the present disclosure will be described by reference to the following figures, wherein.

DESCRIPTION OF EMBODIMENTS

Hereinafter components of a swarf handling device 10 to be incorporated in a machine tool will be described with reference to the drawings. FIG. 1 to FIG. 4 show an example of operation of the swarf handling apparatus 10 incorporated in the machine tool. The machine tool into which the swarf handling apparatus 10 is incorporated is not specifically limited to any particular machine tool so long as it performs machining accompanied with production of stringy swarf 100 which is formed of continuously joined pieces of swarf. The machining that produces the stringy swarf 100 may be cutting including, in particular, turning, drilling, threading, etc. Accordingly, the machine tool may include a lathe, a machining center, a multi-tasking machine which is a combination of a lathe and a machining center, and the like. FIG. 1 to FIG. 4 show by way of example the swarf handling device 10 that is incorporated in a lathe.

In the machine tool (lathe), a workpiece 110 is attached to a main spindle. At the time of machining the workpiece 110, the main spindle causes the workpiece 110 to be rotated about a predetermined rotation axis O. The machine tool is further equipped with a tool post (not-illustrated) for holding one or more tools 112. The tool post is configured to rectilinearly move in accordance with the progress of a machining process, for allowing a tip end of the tool 112 to lathe the workpiece 110. Then, such machining of the workpiece 110 is accompanied by production of stringy swarf 100 which is formed of lengthily and continuously connected pieces of swarf. The stringy swarf 100, which is typically very curly, tends to be easily entangled with other members. When such stringy swarf 100 is left as it is created, the stringy swarf 100 will be entangled with the tool 112 and the workpiece 110, which causes problems in that a machining accuracy may be deteriorated and that the surface of the workpiece 110 may be damaged.

To prevent the problems, the machine tool is equipped with the swarf handling apparatus 10 for handling the stringy swarf 100. The swarf handling apparatus 10 includes a swarf catching device 12 for catching the stringy swarf 100 and a swarf discarding device 14 for conveying and discharging the stringy swarf 100. The swarf discarding device 14 conveys a fed piece of the stringy swarf 100 to the outside of the machine tool and discharges the piece of the stringy swarf 100 from the machine tool. The swarf discarding device 14 is disposed below the workpiece 110, for example, at a site lower than a base surface 116 of the machine tool, and the base surface 116 has a feed mouth 117 which is defined in communication with the swarf discarding device 14. The swarf discarding device 14 includes a chip conveyer 16 for conveying the fed piece of stringy swarf 100 to the outside of the machine tool. For the chip conveyer 16, various types of publicly-known structures may be used, including, for example, a hinged chip conveyer and a scraper type chip conveyer. In addition, the swarf discarding device 14 may be equipped with a shattering mechanism 18 for shredding a fed piece of stringy swarf. The shattering mechanism 18 may be, for example, a shredder in which the fed piece of stringy swarf 100 is shredded by a pair of disc-shaped cutters while being bitten therebetween.

The swarf catching device 12 catches a newly created piece of stringy swarf 100, and directs the caught piece of stringy swarf 100 into the swarf discarding device 14. The swarf catching device 12 includes a holder unit 20 for catching and holding the piece of stringy swarf 100 upon contact with the piece of stringy swarf 100, and a travel mechanism 22 for causing the holder unit 20 to travel. The travel mechanism 22 has capabilities of causing the holder unit 20 to float in a region around a machining point at which the workpiece 110 is machined, and causing the holder unit 20 to travel to a region close to the feed mouth 117 of the swarf discarding device 14. Other than the capabilities, no special limitation is imposed on the travel mechanism 22. As used herein, the expression "to float" denotes any motion that causes a change in position relative to the machining point, including a random and fluffy motion, and may be, of course, include certain types of regular motions, such as a reciprocating motion and a circling motion. While, in FIG. 1 to FIG. 4, an articulated robot having a plurality of articulations is shown, by way of illustration, as the travel mechanism 22, the travel mechanism 22 may be another arrangement, such as, for example, an XYZ table composed of a combination of two or more slide rails, or a parallel link mechanism composed of a plurality of connected link members. Further, although in FIG. 1 to FIG. 4 the travel mechanism 22 is attached to the base surface 116 of the machine tool, the travel mechanism 22 may be attached to another location, such as, for example, a side surface or a top surface of the machine tool. Moreover, the travel mechanism 22 may be disposed on the outside of the machine tool.

The travel mechanism 22 is equipped with the holder unit 20 which is configured to catch and hold the stringy swarf 100 at the time when the holder unit 20 makes physical contact with the stringy swarf 100. Further, the holder unit 20 has a capability of detaching the caught stringy swarf 100 from the swarf catching device 12 as needed. In addition, the holder unit 20 may be a rotatable arrangement that can be rotated to wind the stringy swarf 100 which is gradually grown as the machining continuously progresses.

In the example shown in FIG. 1 to FIG. 4, the holder unit 20 includes a body region 24 attached to a tip end of the travel mechanism 22 and a detachable region 26 substantially shaped like a round bar and protruded from the body region 24. The surface of the detachable region 26 is covered with a fibrous material to facilitate entanglement with the stringy swarf 100. Further, the detachable region 26 can be detached from the body region 24 as needed. Still further, the detachable region 26 is configured to be rotatable. However, the structure of the holder unit 20 shown in FIG. 1 to FIG. 4 is merely an example, and the holder unit 20 may be structured in a different manner. Such different types of the structure of the holder unit 20 will be described below.

The swarf catching device 12 may further include a catch state detecting mechanism for detecting a catch state of the stringy swarf 100; i.e., detecting whether or not the stringy swarf 100 is caught by the holder unit 20. While various arrangements may be used for the catch state detecting mechanism, the catch state detecting mechanism may be, for example, a mechanism in which a resistance to a force for moving the holder unit 20 is detected to thereby determine the catch state of the stringy swarf 100 based on an amount of load exerted by the detected resistance. More specifically, when the stringy swarf 100 is caught by the holder unit 20, the resistance to the force for moving the holder unit 20 becomes greater than that in a case where no stringy swarf is caught. With this in view, a torque sensor for detecting the resistance to the force for moving the holder unit 20 is disposed on the travel mechanism 22 or other components, and when the resistance is a predetermined resistance or greater, it may be determined that the stringy swarf 100 is caught. Alternatively, a camera for capturing an image of the holder unit 20 may be provided to determine, based on image data captured by the camera, whether or not the stringy swarf 100 is caught.

A controller 15 controls actuation of the components in the machine tool, and includes a CPU for performing various arithmetic operations, a storage unit for storing a variety of programs and parameters, an user interface for receiving a command from a user, a communication interface for transmitting and receiving data to and from an external device, and the like. The controller 15 receives an input of a machining program (NC program) via the user interface or the communication interface. After interpreting the machining program, the controller 15 controls actuation of the main spindle and the tool post to implement machining in accordance with the machining program. Further, when the machining is started, the controller 15 also controls actuation of the swarf handling apparatus 10. Specifically, the controller 15 calculates, based on a result of interpreting the machining program, times at which generation of the stringy swarf 100 is started and finished, a speed of generation of the stringy swarf 100, the entire length of the stringy swarf 100, and other parameters, to actuate the swarf handling apparatus 10 in such a manner that the stringy swarf 100 can be appropriately caught and discarded.

Next, a process flow performed in the swarf handling apparatus 10 to handle the stringy swarf 100 will be described. As has been already described, when the machining program is input, the controller 15 actuates the main spindle and the tool post to implement the machining in accordance with the input machining program. Once turning of the workpiece 110 is started with the tool 112, the stringy swarf 100 composed of continuously connected pieces of swarf is generated at the machining point (a contact point of the tool 112 and the workpiece 110). The stringy swarf 100 gradually grows and becomes longer as the machining continuously progresses. Then, the controller 15 operates the travel mechanism 22 to cause the holder unit 20 to be floated in the region around the machining point in such a manner that the position of the holder unit 20 is varied relative to the machining point. In the example illustrated in FIG. 1, the holder unit 20 is circled in the region around the machining point.

The holder unit 20 is floated for the purpose of enabling a reliable catch of the stringy swarf 100 in the holder unit 20. This will be further described in comparison with the related art. In the related art, techniques for catching and collecting the stringy swarf 100 have conventionally been suggested, in which the stringy swarf 100 is caught and collected by sucking the stringy swarf 100 by means of a blower, guiding the string swarf 100 toward a desired direction through a swarf guide channel, and winding the stringy swarf 100 around a spool. In the conventional techniques, however, the position of a swarf collecting component (such as a suction port, the swarf guide channel, or the spool) has been maintained almost constant relative to the machining point. That is, in the conventional techniques the collecting component is moved as the machining point is shifted, which causes no change in the position of the collecting component relative to the machining point. For this reason, it has been necessary for the collecting component (such as the suction port, the swarf guide channel, or the spool) to be precisely placed at a position close to the tip end of the stringy swarf 100 in order to appropriately collect the stringy swarf 100 using the conventional techniques. However, a delivery direction of the stringy swarf 100 can change depending on machining conditions, or may randomly vary regardless of the machining conditions. Due to such changes or variations, it has been almost impossible to precisely predict the position of the tip end of the stringy swarf 100, which makes it difficult for the conventional techniques to appropriately collect the stringy swarf 100.

On the other hand, in the swarf handling apparatus 10 described in this disclosure, the position of the holder unit 20 is varied relative to the machining point by causing the holder unit 20 to float in the region around the machining point. In this way, regardless of whether the position of the tip end of the stringy swarf 100 is precisely predicted, the holder unit 20 can be brought into contact with the stringy swarf 100, to catch the stringy swarf 100 with reliability.

As described above, a form to be floated is not limited to any specific form, and may be of the circling motion, the reciprocal motion, or other motions. No particular limitation is imposed on a range of the floating region, so long as the floating region is located in close proximity to the machining point. It is however preferable that in a case where the delivery direction of the stringy swarf 10 can be roughly predicted, the holder unit 20 should be floated within a predicted range. For example, when the stringy swarf 100 can be predicted to be delivered along a diagonally downward direction from the machining point, the holder unit 20 is preferably floated along the diagonally downward direction. On the other hand, when the delivery direction of the stringy swarf 100 is completely unpredictable, the holder unit 20 is preferably circled along a path surrounding the machining point.

Figure 1:
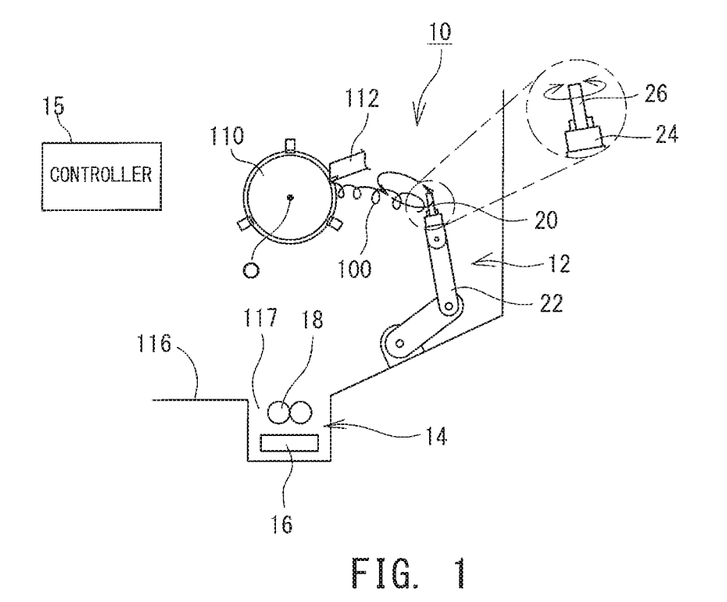
FIG. 1 is a diagram representing an example of operation of a swarf handling apparatus 10 incorporated in a machine tool.
Figure 2:
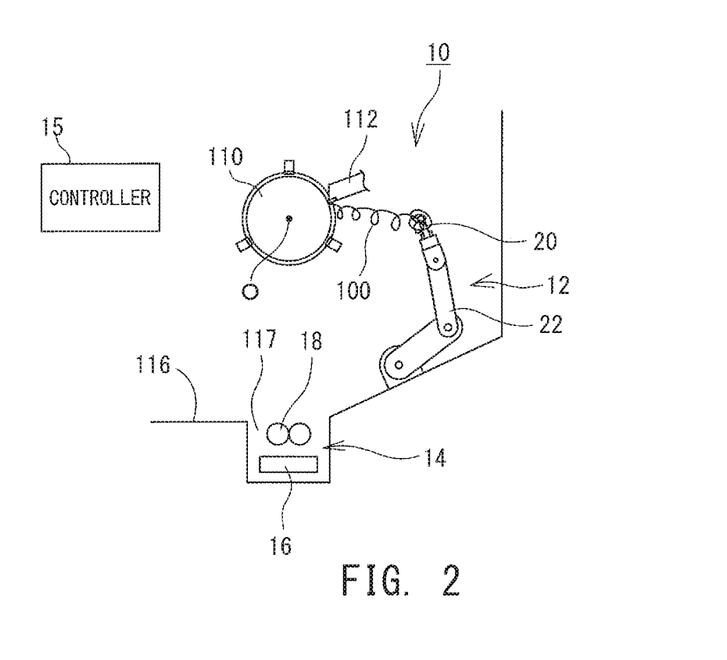
FIG. 2 is a diagram representing the example of operation of the swarf handling apparatus 10 incorporated in the machine tool.

When it can be determined that the stringy swarf 100 is caught by the holder unit 20, the controller 15 causes the holder unit 20 to stop floating. Here, the catch state of the stringy swarf 100 may be determined by detecting, in the catch state detecting mechanism, whether or not the stringy swarf is caught. As an alternative configuration, there may be no catch state detecting mechanism, and the stringy swarf 100 may be determined as being caught after the floating motion of the holder unit 20 is continued for a predetermined length of time. FIG. 2 shows the state of the stringy swarf 100 caught by the holder unit 20.

Figure 3:
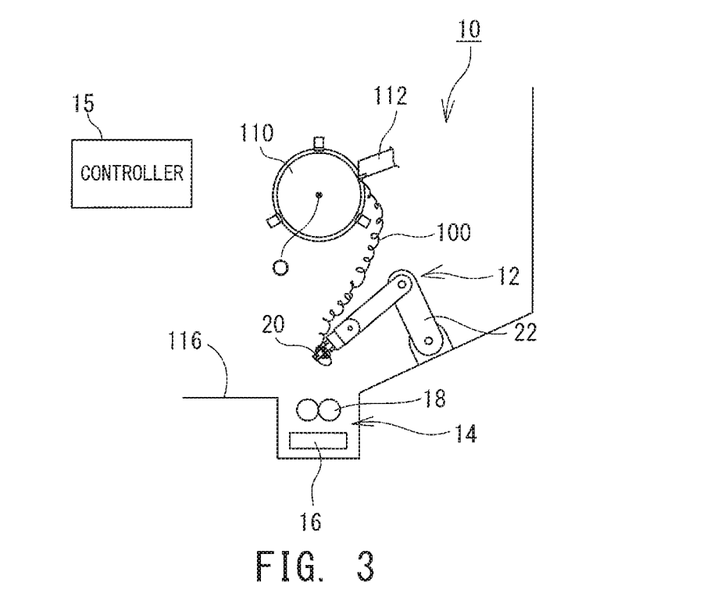
FIG. 3 is a diagram representing the example of operation of the swarf handling apparatus 10 incorporated in the machine tool.

When the holder unit 20 catches the stringy swarf 100, the controller 15 activates, as shown in FIG. 3, the travel mechanism 22 to move the holder unit 20 to a location close to the feed mouth 117. During the movement, the travel speed of the holder unit 20 is set to a speed lower than a generation speed of the stringy swarf 100 for preventing unintentional breakage of the stringy swarf 100 by a pulling force. The generation speed of the stringy swarf 100 can be calculated from factors, such as a rotation speed of the main spindle and the outer diameter of the workpiece 110, and the factors, such as the rotation speed of the main spindle and the outer diameter of the workpiece 110, can be obtained by analyzing the machining program. Further, the controller 15, of course, calculates travel paths of the holder unit 20 and the travel mechanism 22 to find their travel paths that do not interfere with other components (such as the workpiece 110 and the tool 112).

When the holder unit 20 arrives at a position located at the above of and close to the feed mouth 117, the controller 15 causes the caught stringy swarf 100 to be detached from the swarf catching device 12 and introduced into the feed mouth 117 of the swarf discarding device 14. While there are a variety of methods for detaching the stringy swarf 100, in the example of FIG. 4, the entire detachable region 26 retaining the caught stringy swarf 100 is detached from the body region 24 of the holder unit 20 together with the caught stringy swarf 100. The detached detachable region 26 and the stringy swarf 100 are directed by gravitation so as to fall into the feed mouth 117. The stringy swarf 100 directed into the swarf discarding device 14 is continuously collected and conveyed by the swarf discarding device 14 unless the stringy swarf 100 is broken at some point. During a period of collecting the stringy swarf 100 with the swarf discarding device 14, the controller 15 causes the swarf catching device 12 to be retreated to a position where the swarf catching device 12 does not hamper operation of collecting the stringy swarf 100.

It should be noted that before the stringy swarf 100 is guided to and introduced into the swarf discarding device 14, all or a part of the stringy swarf 100 may be wound in the holder unit 20. More specifically, as shown in FIG. 2, in a state where the stringy swarf 100 is caught and retained by the holder unit 20, the holder unit 20 may be rotated, so that the stringy swarf 100 that is continuously growing is wound around the holder unit 20. The speed of rotation of the holder unit 20 is defined to be lower than the speed of growth of the stringy swarf 100.

Figure 4:
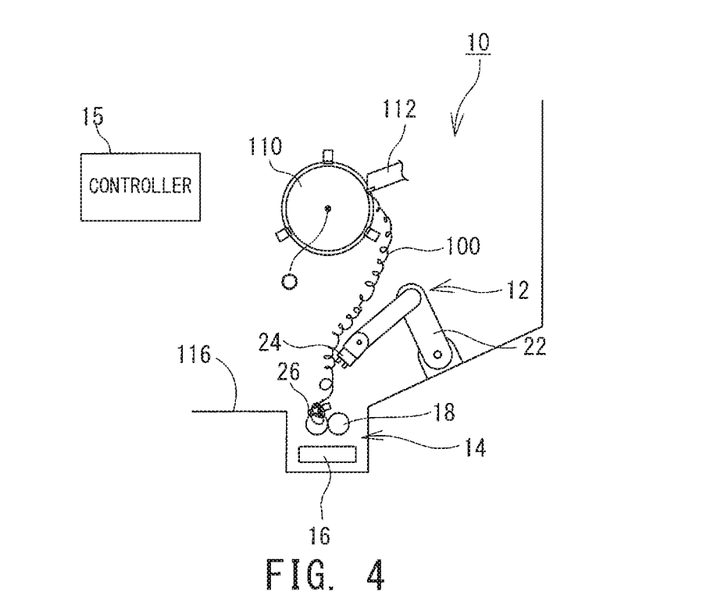
FIG. 4 is a diagram representing the example of operation of the swarf handling apparatus 10 incorporated in the machine tool.

Here, when the machining of the workpiece 110 is temporarily halted, for example, in a case where a machining direction is changed, the tool is replaced, or the machining position is shifted, etc., the stringy swarf 100 stops growing, and is accordingly broken. Then, when the machining is resumed, a new piece of the stringy swarf 100 is again generated and starts growing. In view of such a situation, if and when generation of the new piece of the stringy swarf 100 is determined, the controller 15 causes the holder unit 20 to travel to the region close to the machining point and then causes the holder unit 20 to float in close proximity to the machining point. It should be noted that the controller 15 may determine whether or not a new piece of the stringy swarf 100 is generated, based on a status of progress of the machining (such as a temporarily halt of the machining, the presence or absence of resumed machining operation), or based on a result detected by a sensor, such as a camera. In either case, every time a new piece of the stringy swarf 100 is determined to be generated, the controller 15 causes the holder unit 20 to float for enabling a catch of the new piece of the stringy swarf 100 by the holder unit 20. Then, after the holder unit 20 catches the stringy swarf 100, as shown in FIG. 2 to FIG. 4, the stringy swarf 100 is directed to the swarf discarding device 14 so as to be fed therein.

As can be understood from the above description, in the swarf handling apparatus 10 disclosed in the present disclosure, the holder unit 20 is caused, at the time when generation of the stringy swarf 100 is started, to float in the region around the machining point, so that the position of the holder unit 20 can be varied relative to the machining point. This can ensure that the holder unit 20 is brought into contact with the stringy swarf 100 to catch the stringy swarf 100 even though the delivery position of the stringy swarf 100 cannot be predicted with precision. Then, after the stringy swarf 100 is caught by the holder unit 20, the holder unit 20 is traveled to guide the stringy swarf 100 to the swarf discarding device 14. This action can effectively prevent disorderly movement of the stringy swarf 100 in the region around the machining point and entanglement with the workpiece 110 and the tool 112.

Next, a variety of forms of the holder unit 20 will be explained. As described above, the holder unit 20 is not limited to any particular form as long as the form has the capability of catching and holding the stringy swarf 100 when the holder unit 20 makes contact with the stringy swarf 100. It is however preferable that the holder unit 20 can cause the stringy swarf 100 caught by the holder unit 20 to be detached from the travel mechanism 22 when necessary. It is further preferable that the holder unit 20 has a capability of rotating for allowing the gradually glowing stringy swarf to be wound around the holder unit 20 and collected. It is also preferable that a base portion of the holder unit 20 and the travel mechanism 22 are formed so as not to be easily wound by the stringy swarf, to prevent occurrence of a situation that detachment of the stringy swarf is hampered.

Figure 5A:
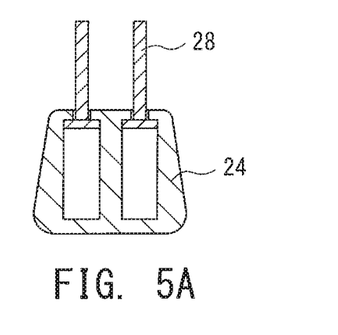
FIG. 5A is a diagram representing an example of a configuration of a holder unit.
Figure 5B:
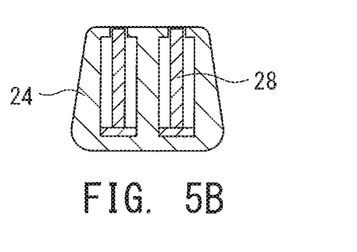
FIG. 5B is a diagram representing the example of the configuration of the holder unit.

To be more specific, the holder unit 20 may include the body region 24 and one or more protruding regions 28 as shown in FIG. 5A and FIG. 5B. In this case, the body region 24 is attached to a tip end of the travel mechanism 22. Although the body region 24 is preferably configured to be rotatable relative to the travel mechanism 22, the body region 24 may be stationary relative to the travel mechanism 22. The body region 24 incorporates in its inside an actuator, such as an electromagnetic cylinder or a hydraulic cylinder, for causing the protruding regions 28 to be protruded from an end surface of the body region 24 and to be retracted inside the body region 24. The circumferential surface of the body region 24 is smoothly tapered to thereby hamper entanglement with the stringy swarf 100. There may be one or more protruding regions 28 (the example of FIG. 5A and FIG. 5B shows two protruding regions 28), and the protruding regions 28 are configured to be protrudable from and retractable into the body region 24.

In operation to catch the stringy swarf 100, the protruding regions 28 are protruded from the body region 24 for allowing the protruding regions 28 to be entangled with the stringy swarf 100. In this operation, the body region 24 may be rotated relative to the travel mechanism 22, to thereby facilitate entanglement with the stringy swarf 100 around the protruding regions 28. On the other hand, in operation to detach the caught stringy swarf 100, the protruding regions 28 are retracted toward the body region 24 as shown in FIG. 5B until the protruding regions 28 are completely depressed below the end surface of the body region 24.

Figure 6A:
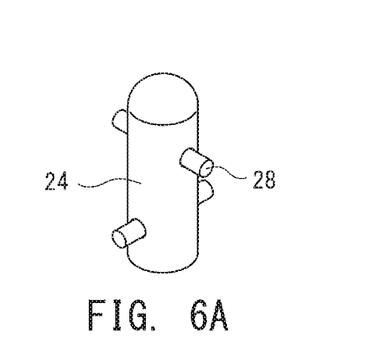
FIG. 6A is a diagram representing another example of the configuration of the holder unit.
Figure 6B:
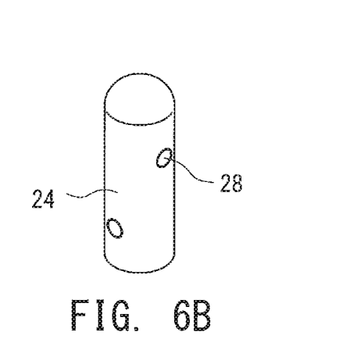
FIG. 6B is a diagram representing the other example of the configuration of the holder unit.

As an alternative form, the holder unit 20 may include, as shown in FIG. 6A and FIG. 6B, the body region 24 formed in a substantially cylindrical shape and a plurality of protruding regions 28 to be protruded from the circumferential surface of the body region 24. The body region 24 is attached to the tip end of the travel mechanism 22. Further, while it is preferable that the body region 24 be rotatable relative to the travel mechanism 22, the body region 24 may be stationary relative to the travel mechanism 22. The body region 24 incorporates in its inside the actuator, such as an electromagnetic cylinder or a hydraulic cylinder, for causing the protruding regions 28 to be protruded from the circumferential surface of the body region 24 and retracted below the end surface of the body region 24. There may be provided one or more protruding regions 28 (the example of FIG. 6A and FIG. 6B shows four protruding regions 28), and the protruding regions 28 are configured to be protrudable from and retractable relative to the body region 24.

In the operation to catch the stringy swarf 100, the protruding regions 28 are protruded from the body region 24 for allowing the protruding regions 28 to be entangled with the stringy swarf 100. In this operation, the body region 24 may be rotated relative to the travel mechanism 22, to thereby facilitate entanglement with the stringy swarf 100 around the protruding regions 28. In the operation to detach the caught stringy swarf 100, the protruding regions 28 may be retracted toward the body region 24 as shown in FIG. 6B until the protruding regions 28 are depressed below the end surface of the body region 24.

Figure 7A:
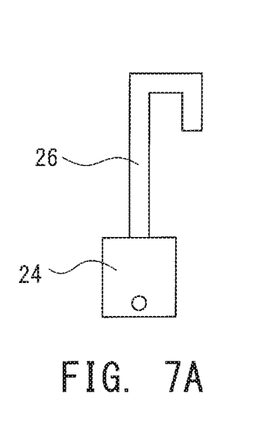
FIG. 7A is a diagram representing a further example of the configuration of the holder unit.
Figure 7B:
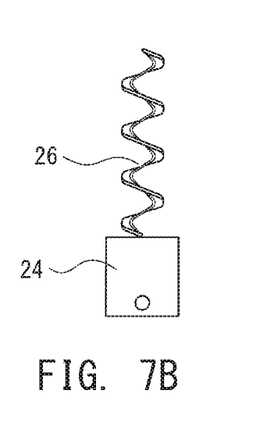
FIG. 7B is a diagram representing a still further example of the configuration of the holder unit.
Figure 7C:
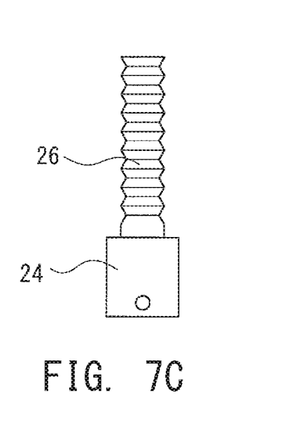
FIG. 7C is a diagram representing another example of the configuration of the holder unit.

As a further alternative form, the holder unit 20 may include, as shown in FIG. 7A to FIG. 7C, the body region 24 and the detachable region 26 extending from the body region 24. The body region 24 is attached to the tip end of the travel mechanism 22. Further, while the body region 24 is preferably configured to be rotatable relative to the travel mechanism 22, the body region 24 may be stationary relative to the travel mechanism 22. The detachable region 26 is a portion that can be detached from the body region 24. The detachable region 26 is formed of a material which can be processed in the swarf discarding device 14. For example, when the swarf discarding device 14 includes the shattering mechanism 18 for shattering the stringy swarf 100, the detachable region 26 is formed of a material that can be shattered by the shattering mechanism 18. In addition, the detachable region 26 is formed in the shape around which the stringy swarf 100 can be easily entangled in any of the examples shown in FIG. 7A to FIG. 7C. In this regard, the detachable region 26 may have a bent shape which is, as shown in FIG. 7A, bent into a substantially C shape, for example. Alternatively, the detachable region 26 may have a substantially coil shape composed of a surface which is continuously curved in a spiral form as shown in FIG. 7B. Further alternatively, the detachable region 26 may have uneven regions on the outer circumferential surface as shown in FIG. 7C. The uneven regions may be composed of grooves extending along a circumferential direction as shown in FIG. 7C, or may be formed like a knurled surface with groves defined in a lattice pattern. Alternatively, rather than defining the grooves on the surface of the detachable region 26, the uneven regions may be formed by covering the outer circumferential surface of the detachable region 26 with a sheet, such as a fibrous sheet, having minute protrusions and depressions.

In the operation to catch the stringy swarf 100, the detachable region 26 is protruded from the body region 24 for allowing the detachable region 26 to be entangled with the stringy swarf 100. In this operation, the body region 24 may be rotated relative to the travel mechanism 22, which can facilitate entanglement with the stringy swarf 100 around the detachable region 26. In the operation to detach the caught stringy swarf 100, the detachable region 26 is detached from the body region 24.

Figure 8:
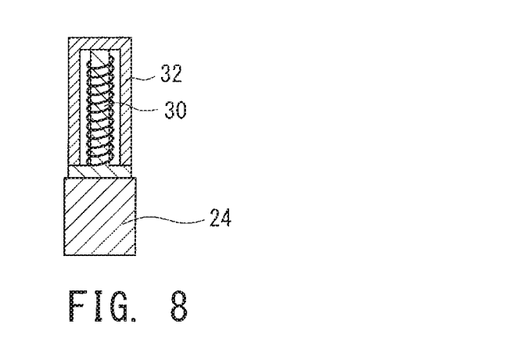
FIG. 8 is a diagram representing still another example of the configuration of the holder unit.

As another alternative form, a magnetic force may be used to catch and detach the stringy swarf 100. As shown in FIG. 8, for example, the holder unit 20 may be equipped with the body region 24, an electromagnet 30, and a magnetic cover 32 that covers the electromagnet 30. In this case, the holder unit 20 is attached to the tip end of the travel mechanism 22. Further, while it is preferable that the body region 24 be rotatable relative to the travel mechanism 22, the body region 24 may be stationary relative to the travel mechanism 22. The electromagnet 30 is connected to a power source which is not shown in FIG. 8, and the magnetic force is produced by applying a current, and dissipated by terminating application of the current. A region surrounding the electromagnet 30 is covered by the magnetic cover 32 formed of a ferromagnetic material. The magnetic cover 32 is contacted with the core of the electromagnet 30, and is therefore configured to be magnetized together when the electromagnet 30 is magnetized. The thus-formed holder unit 20 may be used for catching the stringy swarf 100 which is composed of a ferromagnetic material (such as iron).

In the operation to catch the stringy swarf 100, the current is applied to the electromagnet 30 to magnetize the magnetic cover 32. The stringy swarf 100 composed of the ferromagnetic material is attracted by the magnetic force to adhere to the magnetic cover 32. Then, in the operation to detach the caught stringy swarf 100, application of the current to the electromagnet 30 is stopped.

Figure 9A:
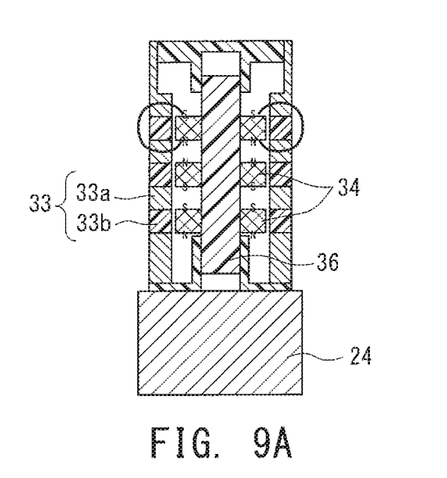
FIG. 9A is a diagram representing a further example of the configuration of the holder unit.
Figure 9B:
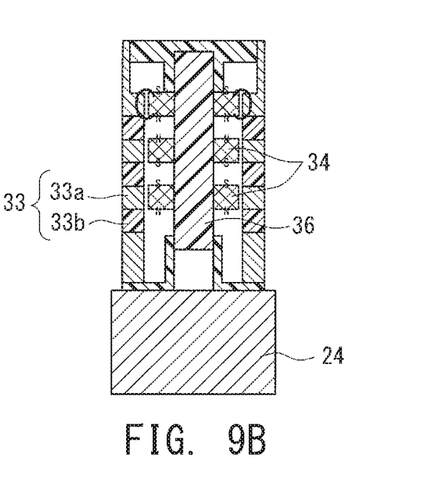
FIG. 9B is a diagram representing the further example of the configuration of the holder unit.

As a further alternative form, the holder unit 20 may include a permanent magnet. FIG. 9A and FIG. 9B show an example of the holder unit 20 including permanent magnets 34. In this example, the holder unit 20 includes a shaft 36 capable of advancing and retreating along an axial direction, a plurality of ring-shaped permanent magnets 34 fixedly inserted on the outer circumference of the shaft 36, and a cover 33 surrounding a region around the permanent magnets 34. The shaft 36 is composed of a nonmagnetic material and caused to advance or retreat along the axial direction by an electromagnetic cylinder or a motor (neither of which is shown in the drawings). The permanent magnets 34 are formed substantially in the shape of rings which are fixedly inserted on the outer circumference of the shaft 36, and configured to have magnetism along a thickness direction of the rings. There may be a plurality of the permanent magnets 34 (three permanent magnets 34 are illustrated in the diagram) spaced at a predetermined interval along the axial direction. Here, the permanent magnets 34 adjacent to each other in the axial direction are disposed so as to have magnetism along opposite directions with respect to each other. For example, the plurality of permanent magnets 34 are disposed in an arrangement in which a one of the permanent magnets 34 has the south pole on its bottom surface, while an adjacent one of the permanent magnets 34 has the south pole on its top surface.

The cover 33 is a substantially cylindrical member arranged coaxially with the shaft 36 and the permanent magnets 34. The cover 33 includes magnetic members 33a formed of a ferromagnetic material and non-magnetic members 33b formed of a non-magnetic material, and the magnetic and non-magnetic members 33a and 33b are alternately arranged along the axial direction of the cover 33. The axial length of the non-magnetic members 33b is substantially equal to the axial length of the permanent magnets 34, and an axial arrangement pitch of the non-magnetic members 33b is substantially equal to an axial arrangement pitch of the permanent magnets 34. Then, advancing and retreating actions of the shaft 36 switch between a catch state in which outer circumferential surfaces of the permanent magnets 34 are opposed in close proximity to inner circumferential surfaces of the non-magnetic members 33b (the state illustrated in FIG. 9A) and a detachment state in which the outer circumferential surfaces of the permanent magnets 34 are opposed in close proximity to inner circumferential surfaces of the magnetic members 33a (the state illustrated in FIG. 9B).

In this case, the operation to catch the stringy swarf 100 formed of the ferromagnetic material is performed by establishing, as shown in FIG. 9A, the catch state with the outer circumferential surfaces of the permanent magnets 34 being opposed in close proximity to the inner circumferential surfaces of the non-magnetic members 33b. In this state, magnetic flux passes from the north pole of a one of the permanent magnets 34 through one of the magnetic members 33a, propagates beyond an adjacent one of the non-magnetic members 33b, and passes through a next adjacent one of the magnetic members 33a into the south pole of the one of the permanent magnets 34. In other words, a magnetic field is extended to the outside of the cover 33, which enables the cover 33 to magnetically attract the stringy swarf 100 formed of the ferromagnetic material.

On the other hand, the operation to detach the caught stringy swarf 100 is performed by establishing, as shown in FIG. 9B, the detachment state with the outer circumferential surfaces of the permanent magnets 34 being opposed in close proximity to the inner circumferential surfaces of the magnetic members 33a. In this state, the magnetic flux passes from the north pole of one of the permanent magnets 34 through a closely opposed one of the magnetic members 33a toward the south pole of the one of the permanent magnets 34 without propagating to the outside. In other words, the magnetic field is looped within the holder unit 20 rather than being extended to the outside. In this state, the cover 33 is no longer able to magnetically attract the stringy swarf 100, thereby causing the stringy swarf 100 to be easily detached from the holder unit 20.

Figure 10A:
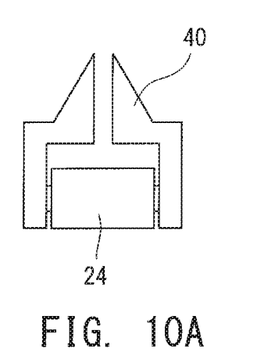
FIG. 10A is a diagram representing another example of the configuration of the holder unit.
Figure 10B:
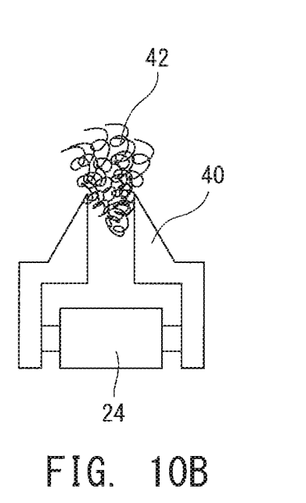
FIG. 10B is a diagram representing the other example of the configuration of the holder unit.

As a still another alternative form, the holder unit 20 may include a gripping member 40 that grips an entanglement member with which the stringy swarf 100 can be easily entangled. For example, as shown in FIG. 10A and FIG. 10B, the holder unit 20 may include the gripping member 40 consisting of a pair of closable arms. In the operation to catch the stringy swarf 100, the gripping member 40 grips an entanglement member 42. Here, the entanglement member 42 may be implemented by one of another piece of the stringy swarf 100, a piece of steel wool, a brush, etc. which can be fed into the swarf discarding device 14. In the operation to detach the caught stringy swarf 100, the pair of arms are opened to release the entanglement member 42.

As a further alternative form, the holder unit 20 may include a suction mechanism for sucking and retaining the stringy swarf 100 that makes contact with the suction mechanism. In this case, the caught stringy swarf 100 can be detached by stopping operation to suck. As an alternative form, the holder unit 20 may include an adhesive agent applied component for adhering and retaining the stringy swarf 100 that makes contact with the component. The caught stringy swarf 100 can be detached by detaching the adhesive agent applied component from the swarf catching device 12. It should be noted that the holder unit 20 is not limited to any of the above-described forms and may have other forms so long as the forms have the capability of holding the contacted stringy swarf.

In addition, the holder unit 20 may include a detachment facilitating mechanism for facilitating detachment of the caught stringy swarf 100 in addition to the above-described components or in place of one or some of the above-described components. The detachment facilitating mechanism may be, for example, a vibration mechanism for vibrating the holder unit 20 that has caught the stringy swarf 100. Alternatively, the detachment facilitating mechanism may be an air blower, a coolant ejecting mechanism, or the like configured to apply a force along a detachment direction to the stringy swarf 100 caught by the holder unit 20. Further, the detachment facilitating mechanism may be a shredder mechanism for shredding the stringy swarf 100 caught by the holder unit 20.

In addition to the above-described components, or in place of one or more of the components, the swarf catching device 12 may include an entanglement hampering mechanism for hampering entanglement with the stringy swarf 100 around the components of the swarf catching device 12 other than a predetermined region. The entanglement hampering mechanism may be, for example, a coating (such as, for example, a fluorine coating) applied to the body region 24 of the holder unit 20, the tip end of the travel mechanism 22, and other regions, the coating encouraging the stringy swarf 100 to slip off. Further, the entanglement hampering mechanism may be a mechanism for blowing a fluid that encourages the string swarf 100 to slip off, such as, for example, oil or air, toward the body region 24 of the holder unit 20, the tip end of the travel mechanism 22, and other regions. Moreover, the body region 24 of the holder unit 20, the tip end of the travel mechanism 22, and other regions may have a surface tapered toward its tip end or a smooth surface without having any protrusions and depressions.

It should be noted that the above-described components and features are disclosed by way of illustration and may be modified or changed so long as the swarf catching device 12 is arranged at least to catch the stringy swarf 100 with the holder unit 20 that is floated in the region around the machining point so as to have positions varied relative to the machining point.

The invention claimed is:

1. A swarf handling apparatus installed in a machining tool that performs machining operation accompanied by production of stringy swarf, comprising:
   a swarf catching device including a holder unit that holds the stringy swarf when the stringy swarf makes contact with the holder unit wherein the swarf catching devices causes the holder unit to move either in a circling manner or in a reciprocating manner in a region around a machining point in such a manner that the position of the holder unit is continuously varied relative to the machining point, for catching the stringy swarf; and
   a swarf discarding device that receives and discards the stringy swarf, wherein
   the swarf catching device directs the caught stringy swarf to the swarf discarding device to discard the stringy swarf,
   the swarf catching device causes the holder unit having caught the stringy swarf to travel toward the swarf discarding device, to thereby direct the caught stringy swarf to the swarf discarding device, and
   a travel speed of the holder unit traveling toward the swarf discarding device is lower than or equal to a speed of growth of the stringy swarf.

2. The swarf handling apparatus according to claim 1, wherein:
   at least a part of the holder unit is configured to be rotatable.

3. The swarf handling apparatus according to claim 1, wherein:
   the holder unit comprises at least one of a protruding region, a bent region, an uneven region, and a curved region to hold the stringy swarf engaged with the at least one of the regions.

4. The swarf handling apparatus according to claim 1, wherein:
   the holder unit comprises a magnet, and uses a magnetic force for holding stringy swarf formed of a ferromagnetic material.

5. The swarf handling apparatus according to claim 1, wherein:
   the holder unit comprises a gripping member that detachably grips an entanglement member around which the stringy swarf is entangled, and holds the stringy swarf entangled with the entanglement member.

6. The swarf handling apparatus according to claim 1, wherein:
   the holder unit comprises a detachable region that is detachable together with the caught stringy swarf from the swarf catching device.

7. The swarf handling apparatus according to claim 1, wherein:
   the holder unit comprises a body region and a protruding region configured to be protrudable from and retractable into the body region, wherein the protruding region is protruded from the body region to hold the stringy swarf that is engaged with the protruding region, and the protruding region is retracted inside the body region to detach the stringy swarf from the holder unit.

8. The swarf handling apparatus according to claim 1, wherein:
   the holder unit comprises an electromagnet, wherein the stringy swarf is held using a magnetic force produced by energizing the electromagnet, and detached from the holder unit by deenergizing the electromagnet.

\* \* \* \* \*

UNITED STATES PATENT AND TRADEMARK OFFICE
CERTIFICATE OF CORRECTION

PATENT NO. : 10,702,962 B2  
APPLICATION NO. : 15/964706  
DATED : July 7, 2020  
INVENTOR(S) : Hiroyuki Sugiura Page 1 of 1

It is certified that error appears in the above-identified patent and that said Letters Patent is hereby corrected as shown below:

On the Title Page

Item (54) and in the Specification Column 1 Line 1:
The title SWARF HANDING APPARATUS should be SWARF HANDLING APPARATUS.

Signed and Sealed this
Twenty-second Day of September, 2020

Andrei Iancu
*Director of the United States Patent and Trademark Office*